US012056186B2

(12) United States Patent
Lewis et al.

(10) Patent No.: US 12,056,186 B2
(45) Date of Patent: *Aug. 6, 2024

(54) METHODS, SYSTEMS, AND MEDIA FOR PROVIDING A MEDIA CONSUMPTION HISTORY ANNOTATED WITH SOCIAL CONTEXT

(71) Applicant: Google LLC, Mountain View, CA (US)

(72) Inventors: Justin Lewis, Marina Del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,010

(22) Filed: Sep. 23, 2019

(65) Prior Publication Data

US 2020/0019568 A1 Jan. 16, 2020

Related U.S. Application Data

(63) Continuation of application No. 15/231,295, filed on Aug. 8, 2016, now Pat. No. 10,423,661.

(51) Int. Cl.
*G06F 16/74* (2019.01)
*G06F 3/0482* (2013.01)
(Continued)

(52) U.S. Cl.
CPC .............. *G06F 16/74* (2019.01); *G06F 16/44* (2019.01); *G06F 16/7867* (2019.01);
(Continued)

(58) Field of Classification Search
CPC ........ G06F 16/74; G06F 16/955; G06F 16/44; G06F 16/7867; G06F 3/0482;
(Continued)

(56) References Cited

U.S. PATENT DOCUMENTS 7,886,217 B1 * 2/2011 Henzinger ............ G06F 16/958
715/205
8,196,051 B2 * 6/2012 Zaner .................. H04L 12/1822
715/758
(Continued)

FOREIGN PATENT DOCUMENTS

| CN | 101622837 | 1/2010 |
| CN | 104813305 | 7/2015 |

(Continued)

OTHER PUBLICATIONS

Geeker Magazine, "How to Delete YouTube Watch History and Search History", Sep. 29, 2014, available at: http://geekermagazine.com/how-to-delete-youtube-watch-history-and-search-history/, last accessed Nov. 10, 2017, pp. 1-4.

(Continued)

*Primary Examiner* — Andrew T Chiusano
(74) *Attorney, Agent, or Firm* — Shumaker & Sieffert, P.A.

(57) ABSTRACT

Methods, systems, and media for providing a media consumption history annotated with social context. In some embodiments, the method comprises: receiving, from a first user device that is associated with a sharing user, a request to share a video item; providing an address associated with the video item; receiving a request, associated with the address, to play the video item; determining, based on the address, that the request to play the video item is associated with the request to share the video item; and causing, via a user interface, a media consumption history to be presented that includes an indication that the video item was shared by the sharing user.

18 Claims, 8 Drawing Sheets

(51) Int. Cl.

| | |
|---|---|
| *G06F 3/04842* | (2022.01) |
| *G06F 16/44* | (2019.01) |
| *G06F 16/78* | (2019.01) |
| *G06F 16/955* | (2019.01) |
| *G06Q 10/10* | (2023.01) |
| *G06Q 30/0201* | (2023.01) |
| *G06Q 50/00* | (2012.01) |
| *H04L 51/52* | (2022.01) |

(52) U.S. Cl.
CPC .......... *G06F 16/955* (2019.01); *G06Q 10/10* (2013.01); *G06Q 30/0201* (2013.01); *G06F 3/0482* (2013.01); *G06F 3/04842* (2013.01); *G06Q 50/01* (2013.01); *H04L 51/52* (2022.05)

(58) Field of Classification Search
CPC ........................ G06F 3/04842; G06Q 10/10; G06Q 30/0201; G06Q 50/01; H04L 51/32
See application file for complete search history.

(56) References Cited

U.S. PATENT DOCUMENTS

| | | | |
|---|---|---|---|
| 8,949,873 B1 | 2/2015 | Bayer et al. | |
| 9,152,708 B1* | 10/2015 | He | G06F 16/7867 |
| 10,423,661 B2 | 9/2019 | Lewis et al. | |
| 2004/0221309 A1* | 11/2004 | Zaner | G06Q 10/10 |
| | | | 725/35 |
| 2005/0021624 A1* | 1/2005 | Herf | H04L 12/1822 |
| | | | 709/204 |
| 2007/0005713 A1* | 1/2007 | LeVasseur | H04L 51/18 |
| | | | 709/206 |
| 2007/0143417 A1* | 6/2007 | Daigle | G06Q 10/107 |
| | | | 709/206 |
| 2009/0282052 A1* | 11/2009 | Evans | G06Q 30/02 |
| 2013/0018960 A1* | 1/2013 | Knysz | H04L 65/403 |
| | | | 709/204 |
| 2013/0068831 A1* | 3/2013 | Cok | G06F 16/955 |
| | | | 235/375 |
| 2013/0305164 A1* | 11/2013 | Karunamuni | H04M 1/7243 |
| | | | 715/752 |
| 2014/0108531 A1 | 4/2014 | Klau | |
| 2014/0282901 A1* | 9/2014 | Dwan | H04L 67/22 |
| | | | 726/4 |
| 2014/0344369 A1* | 11/2014 | Goldberg | H04L 51/34 |
| | | | 709/206 |
| 2015/0127603 A1* | 5/2015 | Cohen | H04L 51/046 |
| | | | 707/608 |
| 2015/0341304 A1 | 11/2015 | Sherman et al. | |
| 2015/0356195 A1* | 12/2015 | Kilzer | G06F 40/14 |
| | | | 715/234 |
| 2017/0038922 A1* | 2/2017 | Eim | G06F 3/0482 |
| 2018/0039698 A1* | 2/2018 | Lewis | G06F 16/74 |
| 2018/0052840 A1* | 2/2018 | Scott | H04L 12/1831 |

FOREIGN PATENT DOCUMENTS

| | | |
|---|---|---|
| CN | 105659230 | 6/2016 |
| WO | WO 2015017004 | 2/2015 |

OTHER PUBLICATIONS

International Search Report and Written Opinion dated Oct. 20, 2017 in International Patent Application No. PCT/US2017/044908.
Notice of Allowance dated May 15, 2019 in U.S. Appl. No. 15/231,295.
Office Action dated May 31, 2018 in U.S. Appl. No. 15/231,295.
Office Action dated Nov. 20, 2018 in U.S. Appl. No. 15/231,295.
Examination Report dated Feb. 5, 2020 in EP Patent Application No. 17752223.2.
Office Action dated Apr. 20, 2020 in CN Patent Application No. 201780043671.8.
Office Action dated Nov. 6, 2019 in CN Patent Application No. 201780043671.8.
Summons to Attend Oral Proceedings dated Sep. 28, 2020 in EP Patent Application No. 17752223.2.
Decision to Refuse a European Patent Application dated Aug. 2, 2021 in EP Patent Application No. 17752223.2.
Communication pursuant to Rules 161(1) and 162 EPC from counterpart European Application No. 17752223.2 dated Feb. 6, 2019, 3 pp.
International Preliminary Report on Patentability from International Application No. PCT/US2017/044908 dated Feb. 12, 2019, 10 pp.
Prosecution History from U.S. Appl. No. 15/231,295, now issued U.S. Pat. No. 10,423,661, dated May 31, 2018 through May 15, 2019, 78 pp.
Response to Communication pursuant to Article 94(3) EPC dated Feb. 5, 2020, from counterpart European Application No. 17752223.2 filed Jun. 12, 2020, 8 pp.
Response to Communication Pursuant to Rules 161(1) and 162 EPC dated Feb. 6, 2019, from counterpart European Application No. 17752223.2, filed Jul. 22, 2019, 9 pp.
Response to Summons to Attend Oral Proceedings pursuant to Rule 115(1) EPC dated Sep. 28, 2020, including Main Request, from European Patent Application No. 17752223.2 filed Jun. 16, 2021, 10 pp.

* cited by examiner

METHODS, SYSTEMS, AND MEDIA FOR PROVIDING A MEDIA CONSUMPTION HISTORY ANNOTATED WITH SOCIAL CONTEXT

CROSS-REFERENCE TO RELATED APPLICATION

This application is a continuation of U.S. patent application Ser. No. 15/231,295, filed Aug. 8, 2016, which is hereby incorporated by reference herein in its entirety.

TECHNICAL FIELD

The disclosed subject matter relates to methods, systems, and media for providing a media consumption history annotated with social context.

BACKGROUND

Many users access media content from services having large collections of media content items. Frequently, these services provide users with access to a history that shows the media content items that the user has consumed, so that the user can, for example, return to the media content item at a later time. Generally, these media consumption histories provide a name for the media content item that the user consumed, a thumbnail image, and/or a date or time that the user consumed the media content item. Users, however, may find it difficult to recall details concerning the name of the media content items that they have consumed, or recall the time at which they consumed these items. As a result, it can be frustrating for a user to determine which media content item they are looking for based on the information provided.

At the same time, it has become increasingly popular for users to share media content items that they find interesting with other users. In many instances, a user may recall that a particular media content item was shared by a certain user. In other instances, a user may recall that the user exchanged messages with another user concerning a media content item.

Accordingly, it is desirable to provide new methods, systems, and media for providing a media consumption history annotated with social context.

SUMMARY

In accordance with some embodiments of the disclosed subject matter, mechanisms for providing a media consumption history annotated with social context are provided.

In accordance with some embodiments of the disclosed subject matter, a method for presenting media consumption information is provided, the method comprising: receiving, from a first user device that is associated with a sharing user, using a hardware processor, a request to share a video item; providing to the first user device an address associated with the video item that includes a plurality of characters associated with the sharing user; receiving, from a second user device that is associated with a consuming user, a request, associated with the address, to play the video item; determining, based on the plurality of characters included in the address, that the request to play the video item is associated with the request, from the first user device, to share the video item; in response to receiving the request to play the video item, storing information related to the request to play the video item with social context information, wherein the social context information comprises information indicating that the request to play the video item is associated with the sharing user; receiving a request for a media consumption history associated with the consuming user; querying the media consumption database for the social context information corresponding to the request to play the video item from the second user device; and causing, via a user interface, a media consumption history to be presented that includes an indication that the video item was shared by the sharing user.

In accordance with some embodiments of the disclosed subject matter, a system for presenting media consumption information is provided, the system comprising a hardware processor that is programmed to: receive, from a first user device that is associated with a sharing user, a request to share a video item; provide to the first user device an address associated with the video item that includes a plurality of characters associated with the sharing user; receive, from a second user device that is associated with a consuming user, a request, associated with the address, to play the video item; determine, based on the plurality of characters included in the address, that the request to play the video item is associated with the request, from the first user device, to share the video item; in response to receiving the request to play the video item, store information related to the request to play the video item with social context information, wherein the social context information comprises information indicating that the request to play the video item is associated with the sharing user; receive a request for a media consumption history associated with the consuming user; query the media consumption database for the social context information corresponding to the request to play the video item from the second user device; and cause, via a user interface, a media consumption history to be presented that includes an indication that the video item was shared by the sharing user.

In accordance with some embodiments of the disclosed subject matter, a non-transitory computer-readable medium containing computer executable instructions that, when executed by a processor, cause the processor to perform a method for presenting media consumption information is provided, the method comprising: receiving, from a first user device that is associated with a sharing user, a request to share a video item; providing to the first user device an address associated with the video item that includes a plurality of characters associated with the sharing user; receiving, from a second user device that is associated with a consuming user, a request, associated with the address, to play the video item; determining, based on the plurality of characters included in the address, that the request to play the video item is associated with the request, from the first user device, to share the video item; in response to receiving the request to play the video item, storing information related to the request to play the video item with social context information, wherein the social context information comprises information indicating that the request to play the video item is associated with the sharing user; receiving a request for a media consumption history associated with the consuming user; querying the media consumption database for the social context information corresponding to the request to play the video item from the second user device; and causing, via a user interface, a media consumption history to be presented that includes an indication that the video item was shared by the sharing user.

In accordance with some embodiments of the disclosed subject matter, a system for presenting media consumption information is provided, the system comprising: means for receiving, from a first user device that is associated with a sharing user, a request to share a video item; means for providing to the first user device an address associated with the video item that includes a plurality of characters associated with the sharing user; means for receiving, from a second user device that is associated with a consuming user, a request, associated with the address, to play the video item; means for determining, based on the plurality of characters included in the address, that the request to play the video item is associated with the request, from the first user device, to share the video item; in response to receiving the request to play the video item, means for storing information related to the request to play the video item with social context information, wherein the social context information comprises information indicating that the request to play the video item is associated with the sharing user; means for receiving a request for a media consumption history associated with the consuming user; means for querying the media consumption database for the social context information corresponding to the request to play the video item from the second user device; and means for causing, via a user interface, a media consumption history to be presented that includes an indication that the video item was shared by the sharing user.

In some embodiments, the request to share a video item is a request to share the video item on a social media platform.

In some embodiments, the information related to the request to play the video item is stored in a media consumption database.

In some embodiments, the social context information further comprises information indicating that the video item was shared in the context of a social messenger conversation.

In some embodiments, the social context information further comprises information indicating other users that were included in the social messenger conversation.

In some embodiments, the social context information further comprises a URL associated with a location in the social messenger conversation where the video item was shared.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments of the disclosed subject matter, mechanisms (which can include methods, systems, and media) for providing a media consumption history annotated with social context are provided.

In some embodiments, the mechanisms described herein can receive a request to share a media content item from a first user device associated with a first user (sometimes referred to herein as a "sharing user"), and provide to the first user device a Uniform Resource Locator ("URL") that is associated with the media content item (e.g., a URL where the media content item can be consumed, or a URL that redirects to a second URL where the media content item can be consumed) and includes social context information concerning the request to share. For example, the sharing user can select a user interface element on the first user device that causes the first user device to request a URL that can be used to share a video. In response to receiving the request, the mechanisms described herein can provide a unique URL that includes, for example, an alphanumeric string that is associated with the social context information. In some embodiments, the social context information can be, for example, an identifier associated with the sharing user and/or an identifier associated with a social messenger conversation where the sharing user intends to post the video. In some embodiments, the mechanisms described herein can generate the URL and/or the alphanumeric string randomly with each request to share and can associate the alphanumeric string with the social context information.

In some embodiments, upon receiving a request, from a second user device associated with a second user (sometimes referred to herein as a "consuming user"), to consume the media content item that was shared by the first user device using the URL provided, the mechanisms described herein can then associate the consuming user's consumption of the media content item with the social context information determined from the URL. For example, if a sharing user shares a video using the URL provided by the mechanisms described herein, and the consuming user selects a hyperlink to the URL, the second user device can transmit a request to the provided URL. Upon receiving the request, the mechanisms described herein can determine that the URL includes an identifier associated with the sharing user and determine that the consuming user's request to play the video is associated with the sharing user's share of the video. In some embodiments, if the consuming user then requests to view the consuming user's media consumption history, the mechanisms described herein can provide a media consumption history that indicates that the video was shared by the sharing user.

It should be noted that, as used herein, the term "media content item" can be applied to video content, audio content, text content, image content, any other suitable media content, or any suitable combination thereof.

Figure 1:
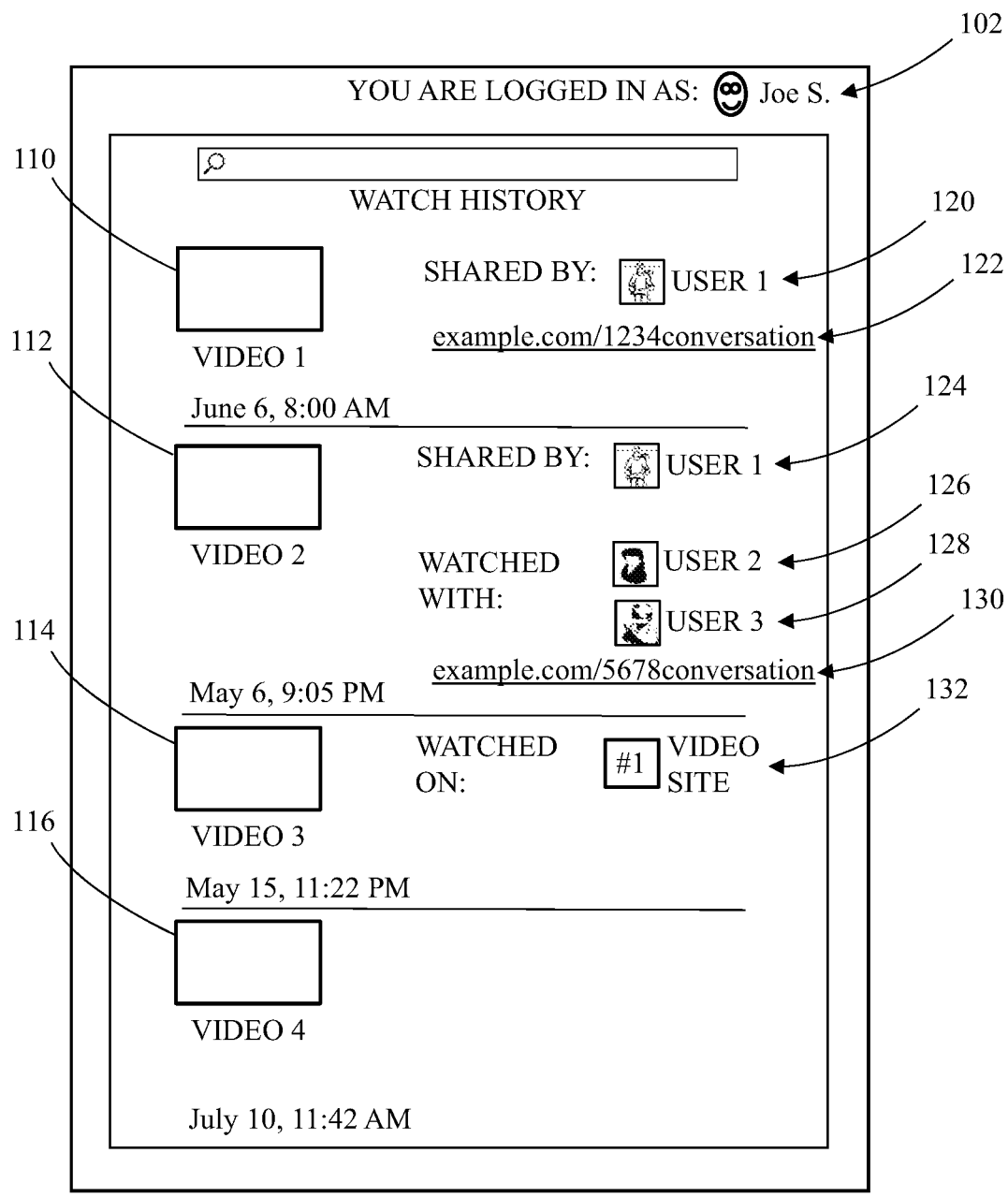
FIG. 1 shows an example of a user interface for presenting a media consumption history annotated with social context in accordance with some embodiments of the disclosed subject matter.

FIG. 1 shows an example 100 of a user interface for presenting a media consumption history annotated with social context in accordance with some embodiments of the disclosed subject matter. As illustrated, in some embodiments, user interface 100 can include video elements 110, 112, 114, and 116, user identifiers 102, 120, 124, 126, and 128, hyperlinks 122 and 130, and third party platform element 132.

User identifier 102 can be any suitable user identifier. In some embodiments, user identifier 102 can be any user interface element suitable for indicating that a user is logged into a user account, such as a hyperlink, text, an image (e.g., an icon), any other suitable indication that a user is logged into a user account, or any suitable combination thereof. As a more particular example, as illustrated in FIG. 1, user identifier 102 can be an icon with an indication of a username (e.g., "Joe S.," as illustrated in FIG. 1).

Video elements 110, 112, 114, and 116 can be any suitable user interface elements corresponding to video content items. For example, any or all of video elements 110, 112, 114, and 116 can be a thumbnail image, an icon, a logo, a title, and/or a hyperlink that corresponds to a video content item, any other suitable user interface element corresponding to a video content item, or any suitable combination thereof.

Although user interface 100 is described herein as generally being directed toward video content, additionally or alternatively, in some embodiments, user interface 100 can be adapted to display user interface elements corresponding to any suitable type of media content items. For example, video elements 110, 112, 114, and/or 116 can correspond in the alternative to audio content (e.g., music), image content (e.g., photos), text content (e.g., media articles), any other suitable type of media content, or any suitable combination thereof.

User identifiers 120, 124, 126, and 128 can be any suitable user identifiers. In some embodiments, user identifiers 120, 124, 126, and 128 can be any user interface element suitable for identifying a user account, such as a hyperlink, text, an image (e.g., an icon), any other element suitable for identifying a user account, or any suitable combination thereof.

In some embodiments, user interface 100 can be configured such that user identifiers 120, 124, 126, and 128 are positioned in a location relative to video elements 110, 112, 114, and 116 so as to indicate a social context (e.g., a social context as described below in connection with FIG. 4). For example, as illustrated in FIG. 1, user interface 100 can indicate that the user associated with the media consumption history being presented (e.g., "Joe S.," as illustrated in FIG. 1) requested a video content item associated with video element 110, which was shared with the user by a user account associated with user identifier 120 (e.g., a user account with username "USER 1," as illustrated in FIG. 1). As another example, user interface 100 can indicate that a user (e.g., "Joe S.," as illustrated in FIG. 1) played a media content item in connection with other users (e.g., watched a video content item in the context of a social messenger conversation, as described below in connection with FIG. 4, FIG. 5, and FIG. 8). As a more particular example, as illustrated in FIG. 1, user interface 100 can indicate that the user associated with user identifier 104 (e.g., "Joe S.," as illustrated in FIG. 1), watched video content item 112 in connection with users associated with user identifier 126 (e.g., "USER 2," as illustrated in FIG. 1) and user identifier 128 (e.g., "USER 3," as illustrated in FIG. 1).

In some embodiments, user interface 100 can indicate that video elements 110, 112, 114, and/or 116 were shared in the context of a social messenger conversation (e.g., as described below in connection with FIG. 4, FIG. 5, and FIG. 8) by providing hyperlinks 122 and 130 that, upon selection, each cause a user device presenting user interface 100 to present a corresponding social messenger conversation. For example, as illustrated in FIG. 1, user interface 100 can indicate that a video content item associated with video element 110 was shared in the context of a social messenger conversation by presenting hyperlink 122, which, upon selection, can direct a user device presenting user interface 100 to a social messenger conversation that is available at "example(dot)com/1234conversation."

In some embodiments, hyperlinks 122 and 130 can be implemented as any user interface element suitable for causing a corresponding social messenger conversation to be presented upon receiving a user selection of the user interface element. For example, hyperlinks 122 and 130 can be implemented as a button, an icon, a tab, a formatted hyperlink, any other any user interface element suitable for presenting a corresponding social messenger conversation, or any suitable combination thereof.

Additionally or alternatively, although hyperlinks 122 and 130 are shown, user interface 100 can be adapted to provide any user interface element suitable for indicating that a media content item was shared in the context of a social messenger conversation, such as an icon, a button, text, an image, any other suitable indication that a media content item was shared in the context of a social messenger conversation, or any suitable combination thereof.

In some embodiments, user interface 100 can indicate that a media content item was consumed, played, and/or shared on a third party platform (e.g., as described below in connection with 606 of FIGS. 6 and 708 of FIG. 7) by presenting a third party platform element 132. For example, as illustrated in FIG. 1, user interface 100 can present third party platform element 132 in proximity to video content item 114 to indicate that the user associated with the media consumption history that is being presented by user interface 100 requested a video content item associated with video element 114, which was shared on a third party platform associated with third party platform element 132 (e.g., "VIDEO SITE," as illustrated in FIG. 1).

In some embodiments, third party platform element 132 can be any user interface element suitable for indicating that a media content item was consumed, played and/or shared on a third party platform, such as a button, a hyperlink, text, an image (e.g., an icon and/or thumbnail), any other suitable indication that a media content item was shared in the context of a social messenger conversation, and/or any suitable combination thereof.

Figure 2:
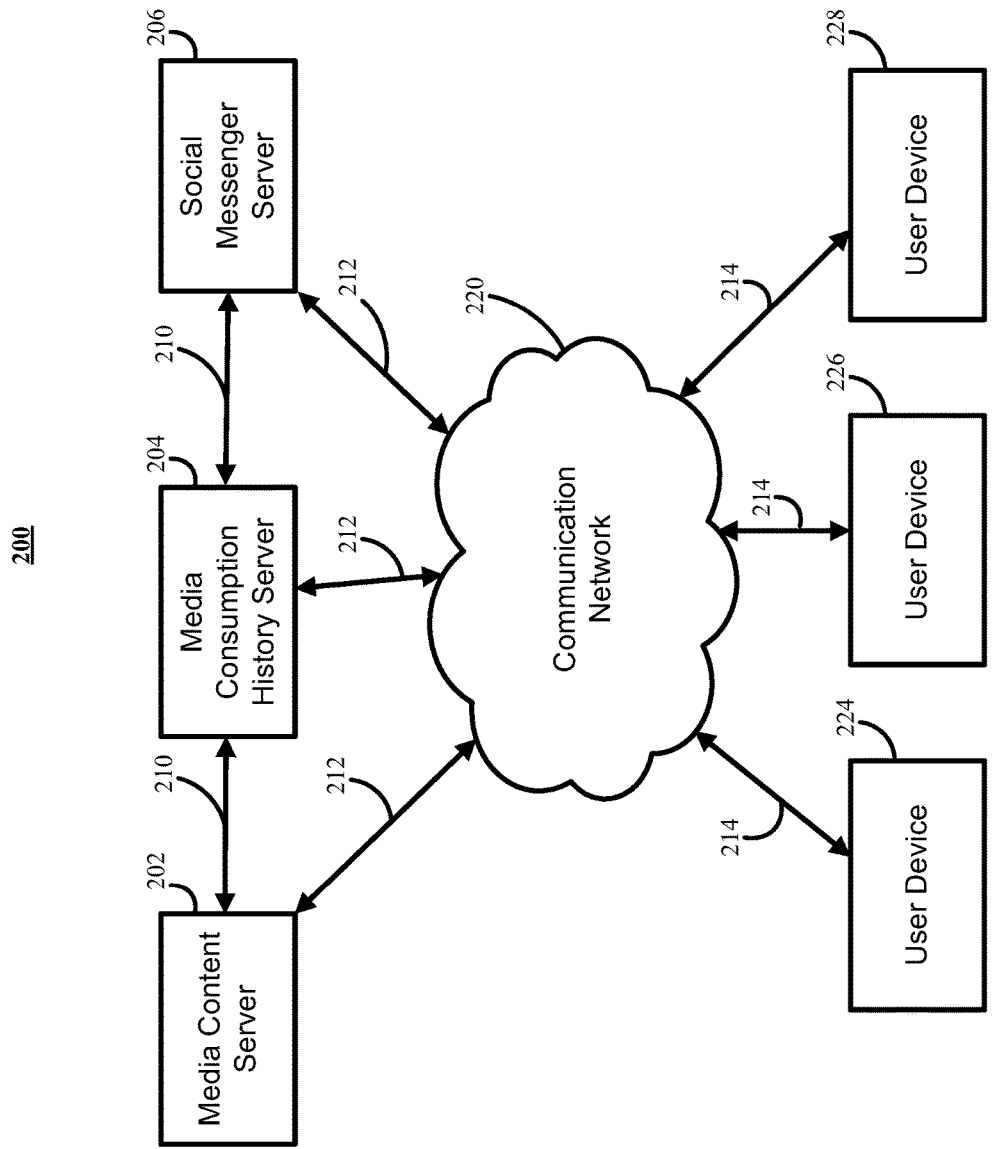
FIG. 2 shows a schematic diagram of a system suitable for implementation of the mechanisms described herein for providing a media consumption history annotated with social context in accordance with some embodiments of the disclosed subject matter.

FIG. 2 shows an example 200 of hardware that can be used in accordance with some embodiments of the disclosed subject matter for providing a media consumption history annotated with social context. As illustrated, hardware 200 can include one or more servers, such as a media content server 202, a media consumption history server 204, and a social messenger server 206, as well as a communication network 220, and/or one or more user devices, such as user devices 224, 226, and 228.

In some embodiments, media content server 202 can be any suitable server for storing media content and delivering the content to user devices 224, 226, and/or 228. For example, media content server 202 can be a server that streams media content to user devices 224, 226, and/or 228 via communication network 220. Media content provided by media content server 202 can be any suitable media content, such as video content, audio content, image content, text content, and/or any other suitable type of media content. As a more particular example, media content can include user-generated content, music videos, television programs, movies, cartoons, sound effects, streaming live content (e.g., a streaming radio show, a live concert, and/or any other suitable type of streaming live content), and/or any other suitable type of media content. Media content can be created by any suitable entity and/or uploaded to media content server 202 by any suitable entity. In some embodiments, media content server 202 can be omitted.

In some embodiments, media consumption history server 204 can be any suitable server for storing and/or transmitting information related to user consumption of media content items. As a more particular example, in some embodiments, media consumption history server 204 can store and/or transmit metadata that is associated with media content items. As another more particular example, in some embodiments, media consumption history server 204 can host a media consumption history database that stores information related to media content items consumed by users of a social media platform. For example, as described below in connection with FIG. 4, a media consumption history database can include social context information related to user requests for media content items, such as social context information indicating which user shared a media content item that was consumed by a user, information indicating a social messenger conversation that a media content item that was consumed by a user was shared within, and/or any other social context information described below in connection with FIG. 4, FIG. 5, and/or FIG. 6. As another example, a media consumption history database can store information indicating a date and/or time that a media content item was requested. In some embodiments, media consumption history server 204 can be omitted.

In some embodiments, social messenger server 206 can be any suitable server for storing and/or transmitting information related to social messaging on a social media platform. As a more particular example, in some embodiments, social messenger server 206 can store and/or transmit metadata that is associated with social messages. As another more particular example, in some embodiments, social messenger server 206 can include a social messenger database that stores information related to messages exchanged on the social media platform, such as the date and/or time of messages, information about media content items contained in the messages, information indicating the users included in the messages, any other suitable social messenger data, and/or any suitable combination thereof. As another example, a social messenger database can include social context information as described below in connection with FIG. 4, FIG. 5, and/or FIG. 6. In some embodiments, media consumption history server 204 can be omitted.

Communication network 220 can be any suitable combination of one or more wired and/or wireless networks in some embodiments. For example, communication network 220 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 224, 226, and/or 228 can be connected by one or more communications links 214 to communication network 220 which can be linked via one or more communications links 212 to media content server 202, media consumption history server 204, and/or media consumption history server 206. Media content server 202, media consumption history server 204, and media consumption history server 206 can be linked via one or more communications links 210. Communications links 210, 212, and/or 214 can be any communications links suitable for communicating data among user devices 224, 226, and/or 228, such as network links, dial-up links, wireless links, hard-wired links, any other suitable communications links, or any suitable combination of such links.

User devices 224, 226, and/or 228 can include any one or more user devices suitable for requesting media content, searching for media content, presenting media content, presenting advertisements, receiving input for presenting media content and/or any other suitable functions. For example, in some embodiments, any or all of user devices 224, 226, and 228 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, any or all of user devices 224, 226, and 228 can be implemented as a non-mobile device such as a desktop computer, a set-top box, a television, a streaming media player, a game console, and/or any other suitable non-mobile device.

Although media content server 202, media consumption history server 204, and social messenger server 206 are illustrated as separate devices, the functions performed by media content server 202, media consumption history server 204, and social messenger server 206 can be performed using any suitable number of devices in some embodiments. For example, in some embodiments, the functions performed by media content server 202, media consumption history server 204, and/or social messenger server 206 can be performed on a single server. As another example, in some embodiments, multiple devices can be used to implement the functions performed by media content server 202, media consumption history server 204, and social messenger server 206.

Although three user devices 224, 226, and 228 are shown in FIG. 2 to avoid over-complicating the figure, any suitable number of user devices, and/or any suitable types of user devices, can be used in some embodiments.

Media content server 202, media consumption history server 204, social messenger server 206 and user devices 224, 226, and/or 228 can be implemented using any suitable hardware in some embodiments. For example, in some embodiments, devices 202, 204, 206, 224, 226, and/or 228 can be implemented using any suitable general purpose computer or special purpose computer. As another example, a mobile phone may be implemented using a special purpose computer. Any such general purpose computer or special purpose computer can include any suitable hardware.

Figure 3:
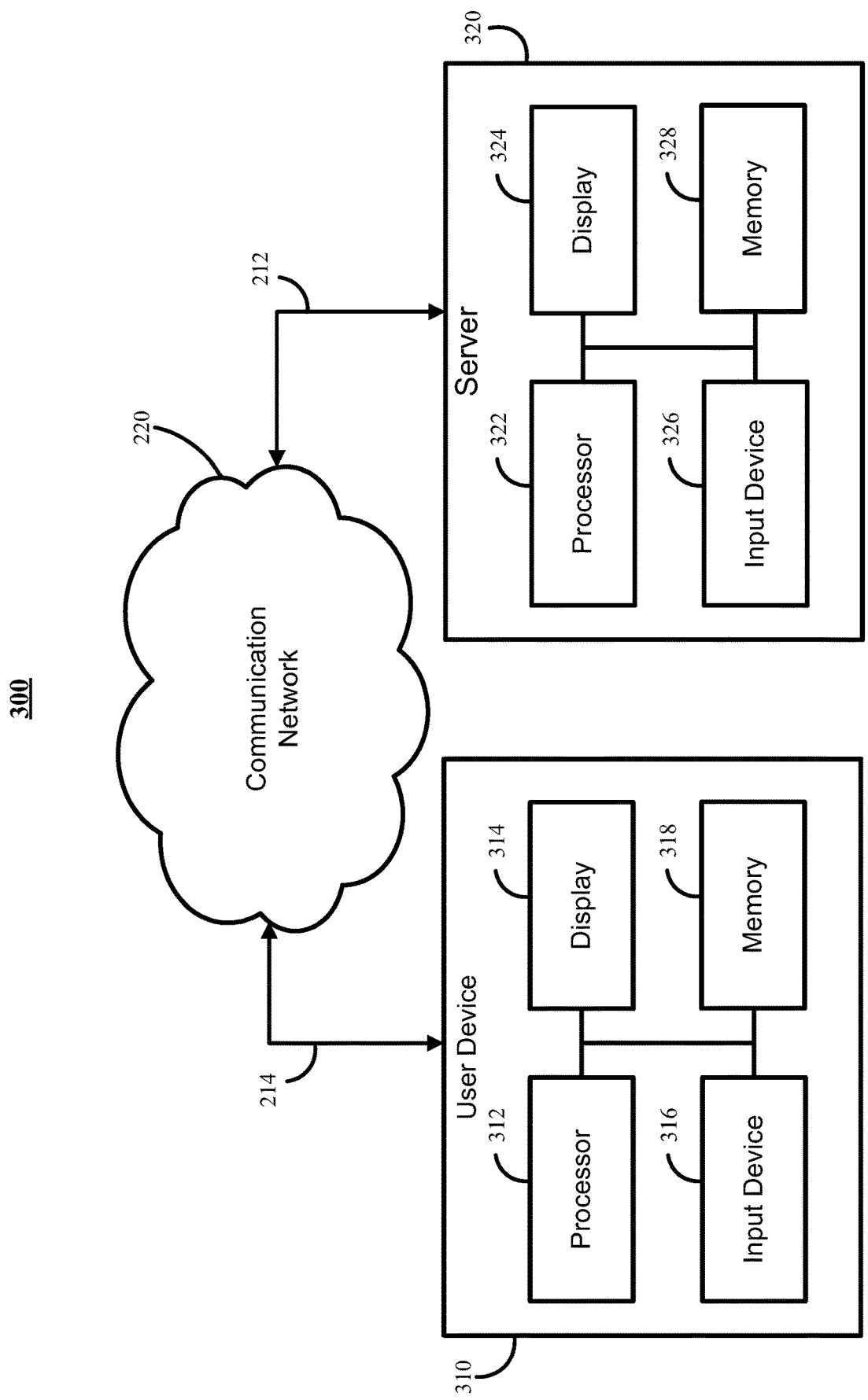
FIG. 3 shows an example of hardware that can be used in a server and/or a user device of FIG. 2 in accordance with some embodiments of the disclosed subject matter.

In some embodiments, turning to FIG. 3, which illustrates example hardware 300, user devices 202, 204, and/or 206, can each be implemented as a user device 310. In some embodiments, media content server 202, media consumption history server 204, and/or media consumption history server 206 can each be implemented, or together be implemented, as a server device 320.

User device 310 can include a hardware processor 312, a memory and/or storage 318, an input device 316, and a display 314. Hardware processor 312 can execute the mechanisms described herein for initiating requests for content, initiating sharing of content, presenting a message to a user, presenting a user interface (e.g., via display 314) as described above in connection with FIG. 1, and below in connection with FIG. 7 and FIG. 8, to perform any other suitable functions in accordance with instructions received as a result of, for example, process 400 described below in connection with FIG. 4, process 500 described below in connection with FIG. 5, and/or process 600 described below in connection with FIG. 6, and/or to send and receive data through communications link 214. In some embodiments, hardware processor 312 can send and receive data through communications link 214 or any other communication links using, for example, a transmitter, a receiver, a transmitter/receiver, a transceiver, or any other suitable communication device. In some embodiments, memory and/or storage 318 can include a storage device for storing data received through communications link 214 or through other links. The storage device can further include a program for controlling hardware processor 322. In some embodiments, memory and/or storage 328 can include information stored as a result of user activity (e.g., sharing content, requests for content, etc.). Display 314 can include a touchscreen, a flat panel display, a cathode ray tube display, a projector, a speaker or speakers, and/or any other suitable display and/or presentation devices. Input device 316 can be a computer keyboard, a computer mouse, a touchpad, a voice recognition circuit, a touchscreen, and/or any other suitable input device.

Server 320 can include a hardware processor 322, a display 324, an input device 326, and a memory and/or storage 228, which can be interconnected. In some embodiments, memory and/or storage 328 can include a storage device for storing data received through communications link 212 or through other links. The storage device can further include a server program for controlling hardware processor 322. In some embodiments, memory and/or storage 328 can include information stored as a result of user activity (e.g., sharing content, requests for content, etc.), and hardware processor 322 can receive requests for a user's media consumption history to be presented by a user device (e.g., user device 224) that requested the media consumption history (e.g., as described below in connection with 410 of FIG. 4). In some embodiments, the server program can cause hardware processor 322 to, for example, execute at least a portion of process 400 described below in connection with FIG. 4, process 500 described below in connection with FIG. 5, and/or process 600 described below in connection with FIG. 6.

Hardware processor 322 can use the server program to communicate with user devices 224, 226, and/or 228 as well as provide access to and/or copies of the mechanisms described herein. It should also be noted that data received through communications links 212 and/or 214 or any other communications links can be received from any suitable source. In some embodiments, hardware processor 322 can send and receive data through communications link 212 or any other communication links using, for example, a transmitter, a receiver, a transmitter/receiver, a transceiver, or any other suitable communication device. In some embodiments, hardware processor 322 can receive commands and/or values transmitted by one or more user devices 224, 226, and 228, such as a user that makes changes to adjust settings associated with the mechanisms described herein for sharing media content items. Display 324 can include a touchscreen, a flat panel display, a cathode ray tube display, a projector, a speaker or speakers, and/or any other suitable display and/or presentation devices. Input device 326 can be a computer keyboard, a computer mouse, a touchpad, a voice recognition circuit, a touchscreen, and/or any other suitable input device.

In some embodiments, server 320 can be implemented in one server or can be distributed as any suitable number of servers. For example, multiple servers 320 can be implemented in various locations to increase reliability and/or increase the speed at which the server can communicate with user devices 310.

Any other suitable components can be included in hardware 300 in accordance with some embodiments.

Figure 4:
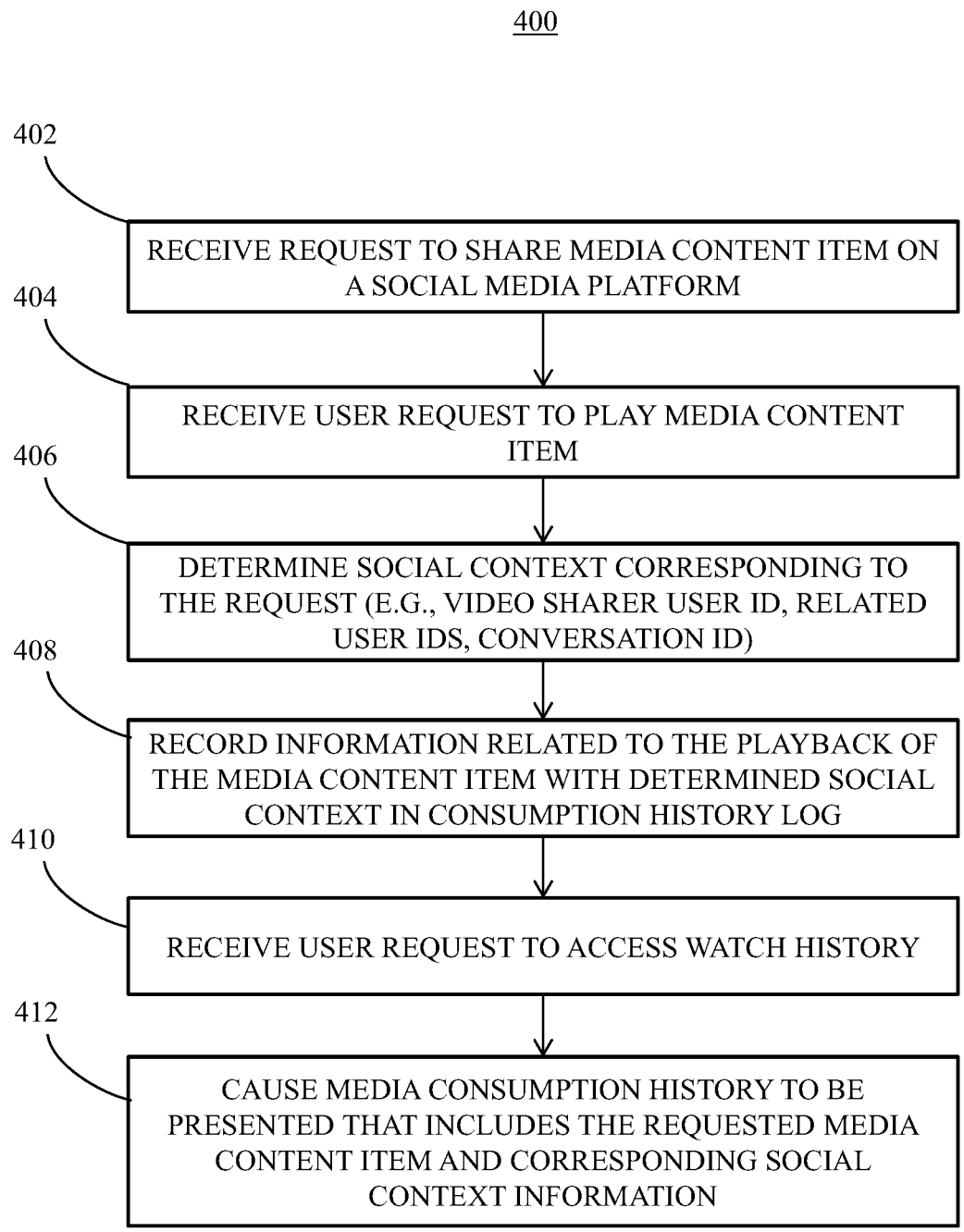
FIG. 4 shows an example of a process for providing a media consumption history annotated with social context in accordance with some embodiments of the disclosed subject matter.

FIG. 4 shows an example 400 of a process for providing a media consumption history annotated with social context in accordance with some embodiments of the disclosed subject matter. In some embodiments, process 400 can be executed by any device or combination of devices. For example, with reference to FIG. 2, process 400 can be executed by media content server 202, media consumption history server 204, social media server 206, any other suitable computing device or combination of devices, or any suitable combination thereof.

At 402, process 400 can receive a request from a user device to share a media content item on a social media platform.

In some embodiments, process 400 can receive the request to share a media content item from a user device (e.g., user device 224, 226, and/or 228, as described above in connection with FIG. 2) that sent the request. The request can be sent by the user device in response to any suitable action taken by a user of the user device. For example, process 400 can receive the request from user device 224, which can send the request in response to a user selection of a sharing function on a user interface that user device 224 is presenting. In a more particular example, a request to share one or more media content items can be sent by user device 224 in response to a user selection of a sharing portion of a user interface (e.g., sharing portion 704, as described below in connection with FIG. 7), for presenting the one or more media content items. As another more particular example, a request to share one or more media content items can be sent by user device 224 in response to selection of an icon or other user interface element (e.g., user interface element 708, as described below in connection with FIG. 7) corresponding to a particular platform (e.g., a social media platform, a content aggregation platform, a media content streaming platform, and/or any other suitable platform). As yet another more particular example, the request can be an indication that a particular user interface element associated with sharing of content (e.g., an icon associated with a platform, a button to request that a URL for sharing the one or more content be generated, a user interface element associated with a sharing portion of the user interface, and/or any other suitable user interface element associated with sharing content) has been selected in the user interface being presented on user device 224.

In some embodiments, the request to share the media content item can be a request to share the media content item in any suitable manner. For example, in some embodiments, the request can be a request to share the one or more media content items to one or more designated platforms that is sent in response to selection of a user interface element associated with the one or more platforms. As another example, a request to share one or more media content items can be sent as a request for an address (e.g., a URL) that can be used to share as a link to the one or more media content items. In response to the request for an address, process 400 can provide an address that includes information associated with social context (e.g., information identifying a user sharing the content, a conversation, and/or any other social context as described below in connection with 406). The information associated with social context can be encoded into the address in the form of a series of alphanumeric characters, a series of symbols, any other suitable code, or any suitable combination thereof. As a more particular example, a known user (e.g., a user that is logged into a platform being used to access the media content item) can cause a user device to request a URL in order to share an audio item. In response to the request for the URL, process 400 can provide a URL to the user device that includes an alphanumeric string which process 400 can associate with the known user. It should be noted that, in some embodiments, process 400 can provide a different alphanumeric string for different requests to share media content items from the same user.

In some embodiments, in response to a request associated with a known user and/or user device, for a URL associated with a media content item, process 400 can generate a random and/or unique alphanumeric code that can be associated with the known user and/or user device. In such an embodiment, for example, process 400 can append the random and/or unique alphanumeric code to a URL associated with the media content item, and provide the URL with the appended alphanumeric code. Additionally, process 400 can log the appended alphanumeric code into a database (e.g., a media consumption database and/or social messenger database as described below in connection with 408 of FIG. 4), such that in response to receiving a request to access the URL with the appended alphanumeric code, process 400 can query the database for the alphanumeric code and determine that the alphanumeric code is associated with the known user that requested the URL associated with the media content item. In some embodiments, in response to receiving a request that includes the URL with the appended alphanumeric code from a user device (e.g., via a web browser), process 400 can redirect the user device to a different URL associated with the media content item (e.g., a web page that includes the media content item).

As still another example, a request to share a media content item can be sent as a request to share a conversation, between users of the social media platform, that includes the media content item. In such an example, the conversation can include a media content item that has been shared within the conversation (e.g., as described below in connection with FIG. 5). As a more particular example, a first user and a second user can be engaged in a conversation via a user interface that facilitates messaging, and the first user can share a video item with the second user via the user interface. The second user can then request to share the conversation, including the video item, with a third user (e.g., by pressing a button, icon, and/or other element on the user interface associated with sharing the conversation). In some embodiments, such a conversation can be a private conversation, and process 400 can provide users that are a part of the private conversation (e.g., the user that initiated the conversation) an opportunity to prevent other users from sharing the conversation and/or inviting others into the conversation (e.g., by providing conversation settings options, providing a user notification, and/or any other suitable method of providing an opportunity to one or more of the users to prevent further sharing and/or invitations).

In some embodiments, the media content item to be shared can be stored (e.g., saved into a memory) at any suitable device. For example, the media content item can be stored at user device 224, media content server 202, any other suitable device, or any suitable combination thereof.

At 404, process 400 can receive a user request to play the media content item that was shared at 402. In some embodiments, the user request to play the media content item can originate from any suitable source. For example, the request can originate from user device 226 or any other device suitable for playing media content.

In some embodiments, the user request to play the media content item can be associated with any suitable user device and/or any suitable user. For example, the request to play the media content item can be associated with a user that is different from the user that requested to share the media content item at 402. As a more particular example, the request to share the media content item (e.g., as described above in connection with 402) can be associated with a sharing user (e.g., a user logged in at user device 224), and the request to play the media content item can be associated with a consuming user (e.g., a user logged in at user device 226).

In some embodiments, the user request to play the media content item received by process 400 can originate from a user device presenting any suitable user interface. For example, process 400 can receive the request from a user device presenting a user interface suitable for playing, sharing, and/or requesting media content, such as a user interface for a video presentation application, a user interface for an audio presentation application, a user interface for an image presentation application, a user interface for a web browser, a user interface for a social media application, a user interface for a social messenger application, and/or any other user interface suitable for playing, sharing, and/or requesting media content. As another example, the request can originate from a user interface suitable for downloading media content, such as a user interface for a media sharing application, a user interface for a media library application, and/or any other user interface suitable for downloading media content.

At 406, process 400 can determine a social context corresponding to the user request to play the media content item.

In some embodiments, process 400 can determine any suitable social context corresponding to the request to play the media content item using any suitable techniques or combination of techniques. For example, process 400 can determine that the media content item requested at 404 was shared at 402 by a particular sharing user (e.g., as described below in connection with 604 of FIG. 6). As another example, process 400 can determine that the media content item was shared within a social messenger conversation between users of a social media platform (e.g., as described below in connection with FIG. 5). In such an example, process 400 can determine that the media content item was shared by a particular user within the conversation (e.g., as described below in connection with 508 of FIG. 5), determine that other particular users were included in the conversation (e.g., as described below in connection with 506 of FIG. 5), determine that the media content item was shared at a particular time and/or location in the conversation (e.g., as described below in connection with 510 of FIG. 5), determine any other suitable information related to the sharing of the media content item, or determine any suitable combination thereof.

At 408, process 400 can record information related to the playback of the media content item, as requested at 404, with the determined social context in a media consumption history log.

It should be noted that, prior to recording information related to a user's playback of media content items, or any other information relating to the user, process 400 can provide the user with an opportunity to provide affirmative consent or authorization to record any of the information described herein. For example, upon loading a media playback application on a user device, the media playback application can prompt the user to provide authorization for recording information associated with a user's playback and/or sharing of media content items.

In a more particular example, in response to downloading the media playback application and/or loading the media playback application on the user device, the user can be prompted with a message that requests that the user provide consent prior to recording any information. Additionally or alternatively, in response to installing the media playback application, the user can be prompted with a permission message that requests that the user provide consent prior to recording any information.

In some embodiments, process 400 can record the information related to the playback of the media content item at 404 in any suitable log. For example, process 400 can record the information in a database, and/or any other suitable data structure. As a more particular example, process 400 can record the information in a media consumption history database located at media consumption history server 204, as described above in connection with FIG. 2.

In some embodiments, process 400 can record the information related to the playback of the media content item, as requested at 404, using any suitable technique or combination of techniques. For example, process 400 can store the information in a log hosted by media consumption history server 204, as described above in connection with FIG. 2, social messenger server 206, as also described above in connection with FIG. 2, any other device suitable for storing information, and/or any suitable combination thereof. In some embodiments, process 400 can cause the information related to the playback of the media content item to be stored by transmitting the information to a server device, a user device, any other suitable computing device, and/or any suitable combination thereof that hosts a log of such information.

In some embodiments, process 400 can record any suitable information related to the playback of the media content item as requested at 404. For example, process 400 can record any suitable social context information as described above in connection with 406 and described below in connection with FIG. 5 and FIG. 6. As a more particular example, the social context information can include information identifying a user that shared the media content item, information identifying a social messenger conversation in which the media content item was shared (e.g., as described below in connection with 504 of FIG. 5), any other suitable social context information, or any suitable combination thereof. As another example, process 400 can record information related to the date and/or time that the consuming user requested the media content item, information identifying a website and/or platform through which the media content item was shared (e.g., a third party social media platform and/or website, and/or any other suitable website and/or platform), and/or information identifying a website and/or platform through which the media content item was requested for playback at 404. As still another example, process 400 can record information identifying a time during playback of the media content item that the consuming user paused and/or stopped playback of the media content item, a time during playback of the media content item that the consuming user posted a comment, a time during playback of the media content item that the consuming user re-shared the media content item, any other suitable times during the playback of the media content, or any suitable combination thereof.

In some embodiments, process 400 can record an address related to the media content item. For example, process 400 can record an address associated with a social messenger conversation in which the media content item was shared. As a more particular example, process 400 can record a URL that directs to the social media conversation in which the media content item was shared. As a still more particular example, the address can include an identifier associated with a particular location in the conversation, such that a request for content associated with the URL causes that particular location in the conversation to be presented. As another more particular example, process 400 can record a local address (e.g., using a Uniform Resource Identifier) that allows an application for presenting media content items and/or for social messaging to present the social messenger conversation in which the media content item was shared.

At 410, process 400 can receive a request to access a media consumption history associated with the user account that was associated with the request to play the media content item at 404. In some embodiments, a request to access the media consumption history associated with the user account can be received in any suitable manner and in response to any suitable action taken by a user device. For example, a request to access the media consumption history can be sent by user device 226, which can send the request in response to a user input on a user interface. As another more particular example, a request to access the media consumption history can be sent by user device 226 in response to selection of an icon corresponding to a media consumption history list (e.g., a media consumption history icon). As still another more particular example, a request to access the user's media consumption history can be sent by user device 226 as an HTTP request.

In some embodiments the request to access the user's media consumption history can be directed to any suitable device. For example, the request can be directed to media consumption history server 204, which can respond by providing the requested media consumption history information. As another example, the request can be directed to media content server 202, which can in turn query media consumption history server 204 for the requested media consumption history information.

In some embodiments, such as embodiments in which a media content item was shared in the context of a social messenger conversation (e.g., as described below in connection with 504 of FIG. 5), media consumption history database 204 can query social messenger database 206 for social context information (e.g., as described above in connection with 406) that may or may not be stored on media consumption history database server 202, such as an address associated with a social messenger conversation wherein the user requested to play the media content item (e.g., as described above in connection with 404), a time during playback of the media content item that the consuming user posted a comment in the context of the social messenger conversation, any other suitable social context information, or any suitable combination thereof.

In some embodiments, in response to the request to access the user's media consumption history, process 400 can provide any suitable information related to the user's media consumption history. For example, process 400 can provide any of the information described above in connection with 406 and/or 408, and/or described below in connection with FIG. 5 and FIG. 6.

At 412, process 400 can cause a media consumption history to be presented that includes the media content item requested at 404 and the corresponding social context information recorded at 408.

In some embodiments, process 400 can cause the media consumption history to be presented using any suitable user interface. For example, process 400 can cause the media consumption history to be presented using a user interface that is part of a mobile application, a web application, a desktop application, and/or any other application suitable for presenting media content. As a more particular example, process 400 can cause the media consumption history to be presented using user interface 100 as described above in connection with FIG. 1. As still another example, process 400 can present the indication via a web browser accessing a web page.

In some embodiments, process 400 can present any suitable indication of the media content item. For example, process 400 can present any suitable user interface element as described below in connection with video elements 110, 112, 114, and/or 116 of FIG. 1.

In some embodiments, process 400 can cause any suitable social context information associated with the media content item that is indicated in the media consumption history to be presented. For example, process 400 can cause information indicating which user shared the indicated media content item (e.g., as described above in connection with 406) to be presented, such as user identifiers 120, 124, 126, and/or 128, as described above in connection with FIG. 1, any other suitable indication of a sharing user, and/or any suitable combination thereof. As another example, process 400 can cause an address (e.g., as described above in connection with 406) associated with the indicated media content item to be presented, such as by causing a hyperlink to be presented (e.g., hyperlink 122 and/or 130, as described above in connection with FIG. 1). As yet another example, process 400 can cause information indicating that the media content item was shared through a particular web site and/or platform (e.g., as described above in connection with 408) to be presented (e.g., via a third party platform element 132, as described above in connection with FIG. 1).

Figure 5:
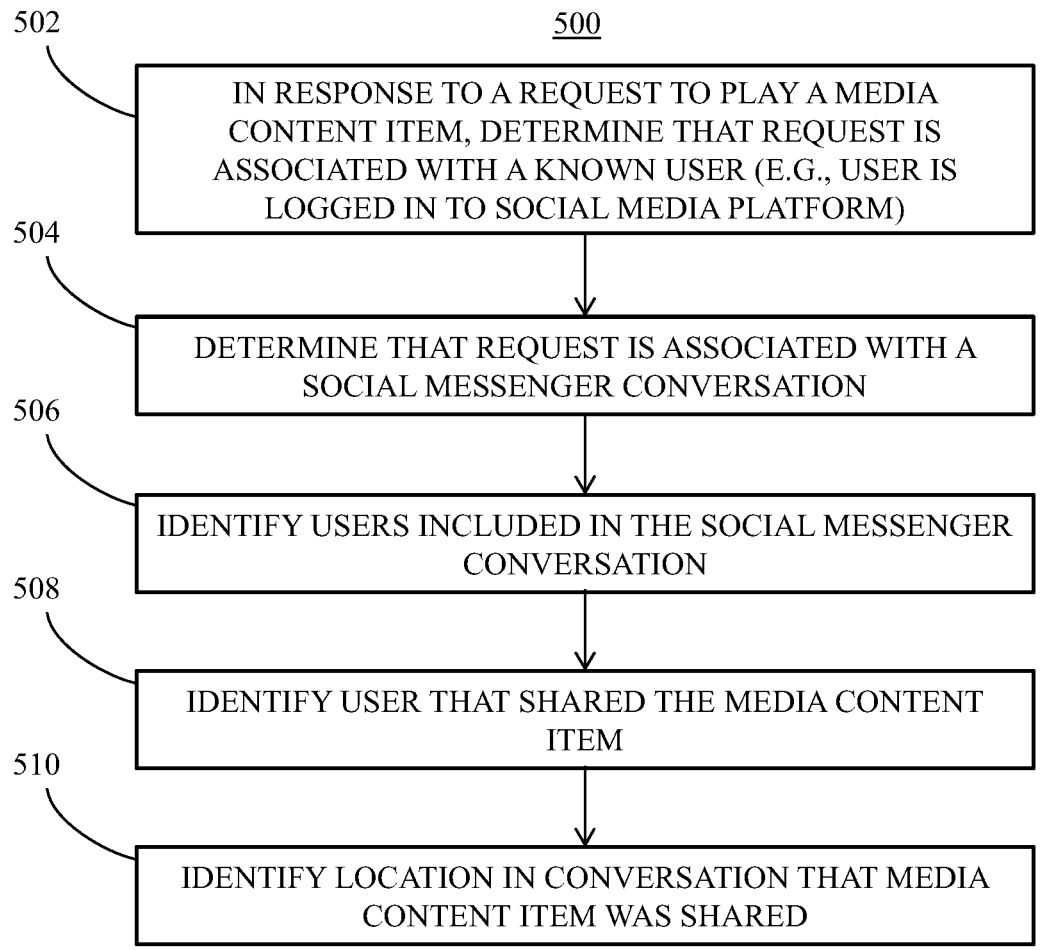
FIG. 5 shows an example of a process for determining a social context corresponding to a request to play a media content item in accordance with some embodiments of the disclosed subject matter.

FIG. 5 is an example 500 of a process for determining social context information associated with a request to play a media content item in accordance with some embodiments of the disclosed subject matter. In some embodiments, process 500 can be executed by any device or combination of devices. For example, with reference to FIG. 2, process 500 can be executed by media content server 202, media consumption history server 204, social media server 206, any other suitable computing device or combination of devices, or any suitable combination thereof.

At 502, in response to a request to play a media content item, process 500 can determine that the request is associated with a known user using any suitable technique or combination of techniques and using any suitable information. For example, process 500 can determine that the request to play the media content item originated from a user device (e.g., user device 224, 226, and/or 228) that is logged into a known user account. As a more particular example, in situations where the requested media content item was shared through a social media platform, user device 224 can be logged into a user account associated with the social media platform, and process 500 can determine that the request to play the media content item is associated with a known user based on the user account.

At 504, process 500 can determine that the request is associated with a social messenger conversation using any suitable technique or combination of techniques and using any suitable information. For example, in situations as described above in connection with 502, when the requested media content item was shared through a social media platform, process 500 can determine that the requested media content item was shared in the context of a social messenger conversation on the social media platform based on an address associated with the request. As a more particular example, as described above in connection with 402 of FIG. 4, the requested media content item, when shared in the context of the social messenger conversation, can be associated with a URL that includes information (e.g., an alphanumeric string appended to the URL, and/or any other suitable encoding as discussed above in connection with 402) identifying the social messenger conversation that it is shared in (e.g., as illustrated in FIG. 1, the URL "example(dot)com/1234conversation"). In such an example, process 500 can determine that the request is associated with a social messenger conversation based on the information identifying the social messenger conversation. As a still more particular example, in some situations, a first known user of a social media platform can, via a first user device (e.g., user device 224), initiate a social messenger conversation with a second known user of the social media platform. Within the context of the conversation, the first known user can share a media content item (e.g., an audio content item) by requesting a hyperlink or other formatted address information (e.g., formatted address information 810, as described below in connection with FIG. 8) that can be used to share the media content item and, as described above in connection with 402, process 400 can provide an address that includes information identifying the conversation initiated by the first known user. Process 500 can then, in response to receiving a request to play the shared audio content item from the second user, via a second user device (e.g., user device 226), determine that the request is associated with the social messenger conversation initiated by the first user based on the address that includes the information identifying the conversation.

As another example, process 500 can determine that the request is associated with a social messenger conversation based on other information contained in the request. For example, in a situation where a user device requests the media content item based on a hyperlink presented in the social messenger conversation, process 500 can receive a request from the user device that includes a URL associated with the social messenger conversation and determine that the request is associated with the social messenger conversation based on the received URL. As another example, process 500 can receive a request that includes information added to the request by the requesting application (e.g., a web browser, a media player application, or any other suitable application) that identifies the social messenger conversation.

At 506, process 500 can identify users that are included in the social messenger conversation that is determined at 504 to be associated with the request to play the media content item using any suitable techniques or combination of techniques and using any suitable information. For example, process 500 can identify users that are included in the conversation based on an address associated with the request to play the media content item. As a more particular example, in some situations, a first known user of a social media platform, via a first user device (e.g., user device 224), can initiate a social messenger conversation with a second known user and a third known user, and can share a media content item (e.g., a video content item) by sending a request for a URL, that can be used to access the media content item, to process 400 (e.g., as described above in connection with 402). Process 400 can respond to the request by providing a URL that includes information identifying the users included in the conversation (e.g., as described above in connection with 402). In such an example, process 500 can then, in response to receiving a request to play the shared video content item from the second known user, via a second user device (e.g., user device 226), identify that the first known user, the second known user, and the third known user were included in the conversation based on the information included in the URL.

At 508, process 500 can identify which user shared the media content item using any suitable technique or combination of techniques and using any suitable information. For example, process 500 can identify which user shared the media content item based on an address associated with the request to play the media content item. As a more particular example, similar to the example of 506, a first known user of a social media platform, via a first user device (e.g., user device 224), initiates a social messenger conversation with a second known user and a third known user, and shares a video content item by sending a request for a URL to process 400 (e.g., as described above in connection with 402). As described above in connection with 402, process 400 can provide a URL that includes information identifying which user shared the video content item. In such an example, process 500 can then, in response to receiving a request to play the shared video content item, at the provided URL, from the second known user, via a second user device (e.g., user device 226), determine that the first known user shared the video content item based on the information included in the provided URL.

At 510, process 500 can identify the location within the social messenger conversation where the requested media content item was shared using any suitable techniques or combination of techniques and using any suitable information. For example, process 500 can identify the location within the social messenger conversation where the requested media content item was shared based on an address associated with the request to play the media content item. As a more particular example, similar to the example of 506, a first known user of a social media platform, via a first user device (e.g., user device 224), initiates a social messenger conversation with a second known user and a third known user, and shares a video content item by sending a request for a URL to process 400 (e.g., as described above in connection with 402). As described above in connection with 402, process 400 can provide a URL that includes information identifying the location in the social messenger conversation where the requested video content item was shared. In such an example, process 500 can then, in response to receiving a request to play the shared video content item from the second known user, via a second user device (e.g., user device 226), identify the location in the social media conversation where the first known user shared the video content item based on the information included in the URL.

In some embodiments, process 500 can identify the location in the social messenger conversation based on any suitable information received from the request to play the video content item. For example, process 500 can identify the location based on information that indicates a time during the conversation, a position in an ordered number of messages in the conversation, a URI associated with the location in the conversation, any other suitable information related to the location in the conversation, or any suitable combination thereof.

In some embodiments, process 500 can identify users included in the social messenger conversation (e.g., as discussed above in connection with 506), identify which user shared the requested media content item (e.g., as discussed above in connection with 508), and/or identify the location in the social messenger conversation that the media content item was shared (e.g., as discussed above in connection with 510), based on the information identifying the social messenger conversation, as discussed above in connection with 504. For example, upon receiving the information identifying the social messenger conversation at 504, process 500 can query a database (e.g., a social messenger database as described above in connection with social messenger server 206) for information identifying the users included in the social messenger conversation, information identifying which user shared the requested media content item, and/or information identifying the location in the social messenger conversation that the media content item was shared.

Figure 6:
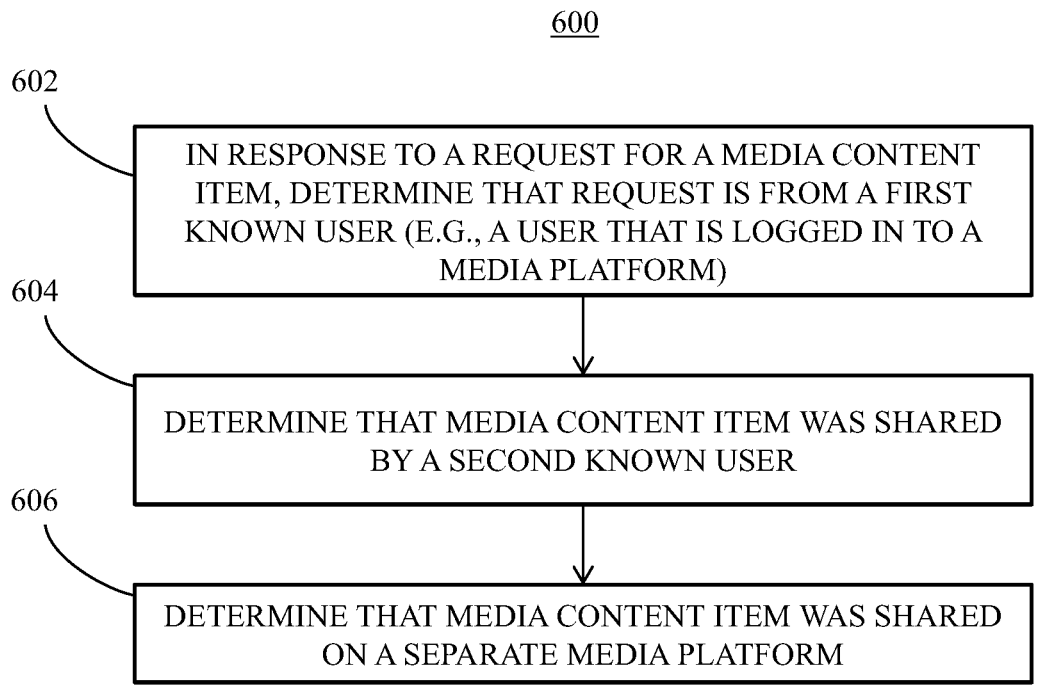
FIG. 6 shows another example of a process for determining a social context corresponding to a request to play a media content item in accordance with some embodiments of the disclosed subject matter.

FIG. 6 shows an example 600 of another process for determining social context information associated with a request to play a media content item in accordance with some embodiments of the disclosed subject matter. In some embodiments, process 600 can be executed by any device or combination of devices. For example, with reference to FIG. 2, process 600 can be executed by media content server 202, media consumption history server 204, social media server 206, any other suitable computing device or combination of devices, or any suitable combination thereof.

At 602, in response to a request to play a media content item, process 600 can determine that the request is associated with a first known user using any suitable techniques or combination of techniques and using any suitable information. For example, process 600 can determine that the request to play the media content item has originated from a first user device (e.g., user device 224, 226, and/or 228) that is logged into a known user account. As a more particular example, in situations where the requested media content item was shared through a social media platform, the first user device can be logged into a user account on the social media platform, and process 600 can determine that the request to play the media content item is associated with a known user based on the user account.

At 604, process 600 can determine that the requested media content item was shared by a second known user using any suitable techniques or combination of techniques, and using any suitable information. For example, process 500 can identify which user shared the media content item based on an address associated with the request to play the media content item. As a more particular example, in some situations, the second known user, via a second user device (e.g., user device 224), requested to share a media content item (e.g., to a third party social media platform) by sending a request for a URL to process 400 (e.g., as described above in connection with 402). As described above in connection with 402, in response to the request, process 400 can associate a URL provided to the second user device with the second user. In such an example, process 600 can then, in response to receiving a request, that includes the provided URL, to play the shared video content item from the first known user, via the first user device, determine that the second known user shared the video content item based on the information included in the URL.

At 606, process 600 can determine that the media content item was shared on a separate media platform using any suitable technique or combination of techniques, and using any suitable information. For example, process 600 can determine that the media content item was shared on a separate media platform based on an address associated with the request to play the media content item. As a more particular example, in some situations, the second known user, via a second user device (e.g., user device 224), requested to share a media content item to a particular third party social media platform by sending a request for a URL to process 400 (e.g., as described above in connection with 402) by selecting a user interface element that is associated with sharing media content items to the particular third party social media platform (e.g., user interface element 708, as described below in connection with FIG. 7). As described above in connection with 402, in response to the request, process 400 can then provide a URL to the second user device that includes information indicating that the media content item is to be shared on the particular third party social media platform. In such an example, process 600 can then, in response to receiving a request (including the provided URL) to play the shared media content item, determine that the media content item was shared on the particular third party social media platform. As another example, process 600 can receive a request that includes information identifying a separate media platform (e.g., a referring URL, a referring top level domain) and determine that the media content item was shared on the separate media platform based on the received URL. As a more particular example, in a situation where the media content item is requested from a third party web page, the request can include a referring URL associated with the third party web page, and process 600 can determine that the media content item was shared on the third party web page based on the included URL.

It should be noted that, in some embodiments, process 400, process 500, and/or process 600 can cause some or all of the above-described blocks to be performed by a third party device or third party process.

In some embodiments, at least some of the above described blocks of the processes of FIG. 4, FIG. 5, and/or FIG. 6 can be executed or performed in any order or sequence not limited to the order and sequence shown in and described in connection with the figures. Also, some of the above blocks of FIG. 4, FIG. 5, and/or FIG. 6 can be executed or performed substantially simultaneously where appropriate or in parallel to reduce latency and processing times. Additionally or alternatively, in some embodiments, some of the above described blocks of the processes of FIG. 4, FIG. 5, and FIG. 6 can be omitted.

Figure 7:
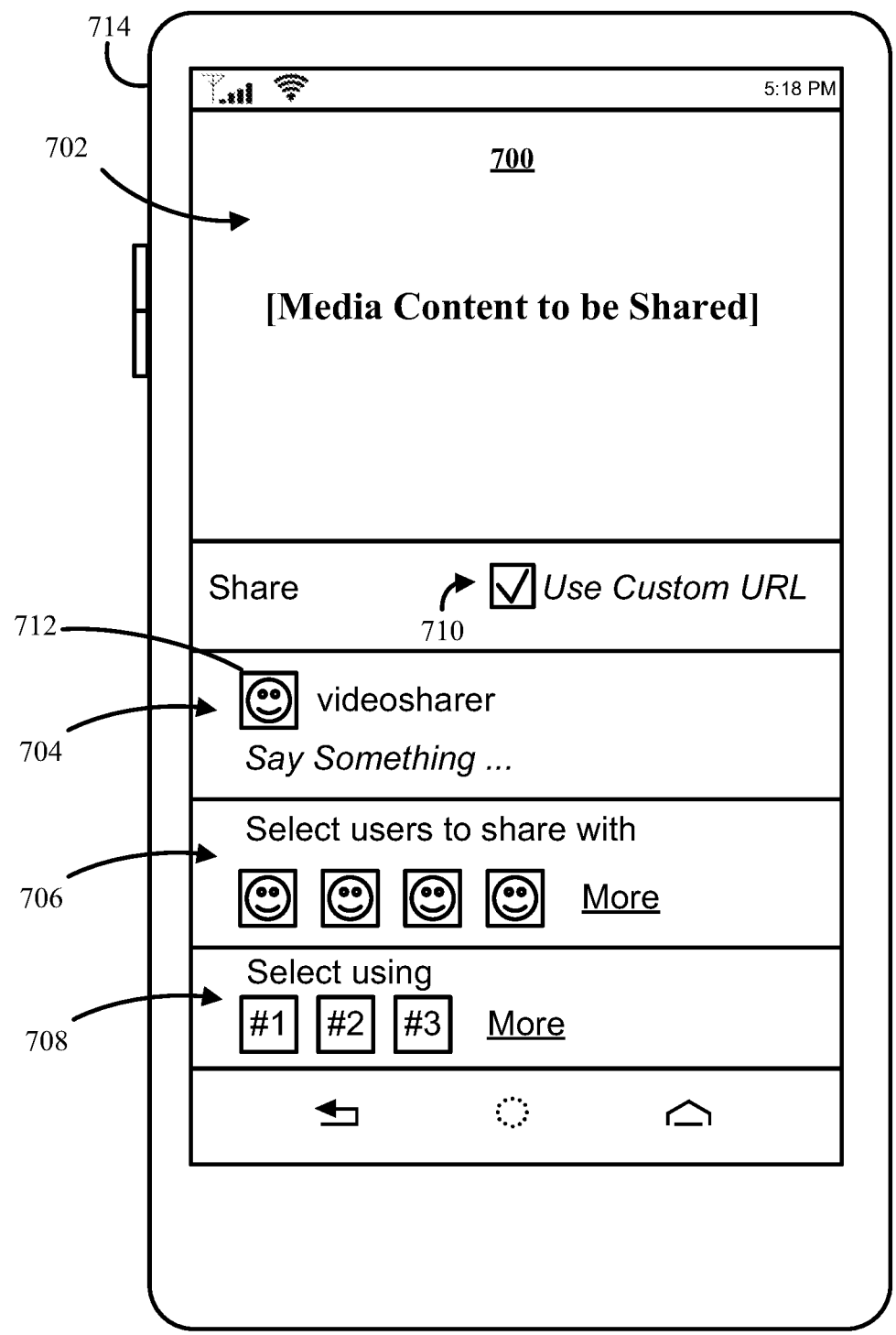
FIG. 7 shows an example of a user interface for sharing a link to a media content item and/or a social messenger conversation related to the media content item on one or more third party platforms from a mobile device in accordance with some embodiments of the disclosed subject matter.

FIG. 7 shows an example 700 of a user interface for sharing a link to a media content item and/or a social messenger conversation related to the media content item on one or more third party platforms from a mobile device in accordance with some embodiments of the disclosed subject matter. As shown in FIG. 7, in some embodiments, user interface 700 can include a portion 702 for presenting the media content item to be shared.

In some embodiments, user interface 700 can include, in a sharing portion, a user interface element 704 for accepting user input to compose a comment to be shared with a link to the media content, which can include a username and/or avatar of a user that is currently logged in to a service (e.g., a social media platform) that provides access to the media content being presented in media presentation portion 702. Additionally, in some embodiments, user interface 700 can include user interface elements 706 for selecting one or more social connections with which to share the media content item and/or user interface elements 708 for selecting one or more third party platforms and/or services for sharing a link to a social messenger conversation related to the media content item (e.g., a social messenger conversation that the media content item was shared in, as described above in connection with FIG. 5).

In some embodiments, user interface 700 can include a user identifier 712 that identifies a known user associated with a user account that is sharing the media content item. In some embodiments, user identifier 712 can be an icon, graphic, image, text, hyperlink, any other suitable user interface element, or any suitable combination thereof. For example, as illustrated in FIG. 7, user identifier 712 can include an icon and text identifying the known user associated with the username "videosharer."

In some embodiments, selection of user interface element 708 to a particular platform can cause a new user interface to be presented by user device 714 that was presenting the user interface associated with the one or more media content items. In such embodiments, the new user interface can be a user interface associated with the platform to which the content is to be shared, such as a web browser window that is used to access a domain of the platform, or an application that can be used to share content to the platform. In some embodiments, receiving a request to open the new user interface can be a request to share the one or more media content items.

In some embodiments, selection of user interface element 710 can cause user device 714 to request a URL from process 400 that can include any of the social context information as described above in connection with FIG. 4. For example, when user interface element 710 is selected, and one of user interface elements 708 is selected, user device 224 can send a request, to process 400, to provide a URL that is associated with media content item 702 and includes information identifying the user and/or user account associated with the request. In response to the request, as described above in connection with FIG. 4, process 400 can provide a URL that includes information identifying "videosharer" as the user and/or user account associated with the request to share (e.g., by including an alphanumeric string, as described above in connection with 402 of FIG. 4).

In some embodiments, user device 714 can be any suitable computing device. For example, user device 714 can be a user device as described above in connection with user device 224, 226, and/or 228. As a more particular example, user device 714 can be a mobile device as illustrated in FIG. 7.

Figure 8:
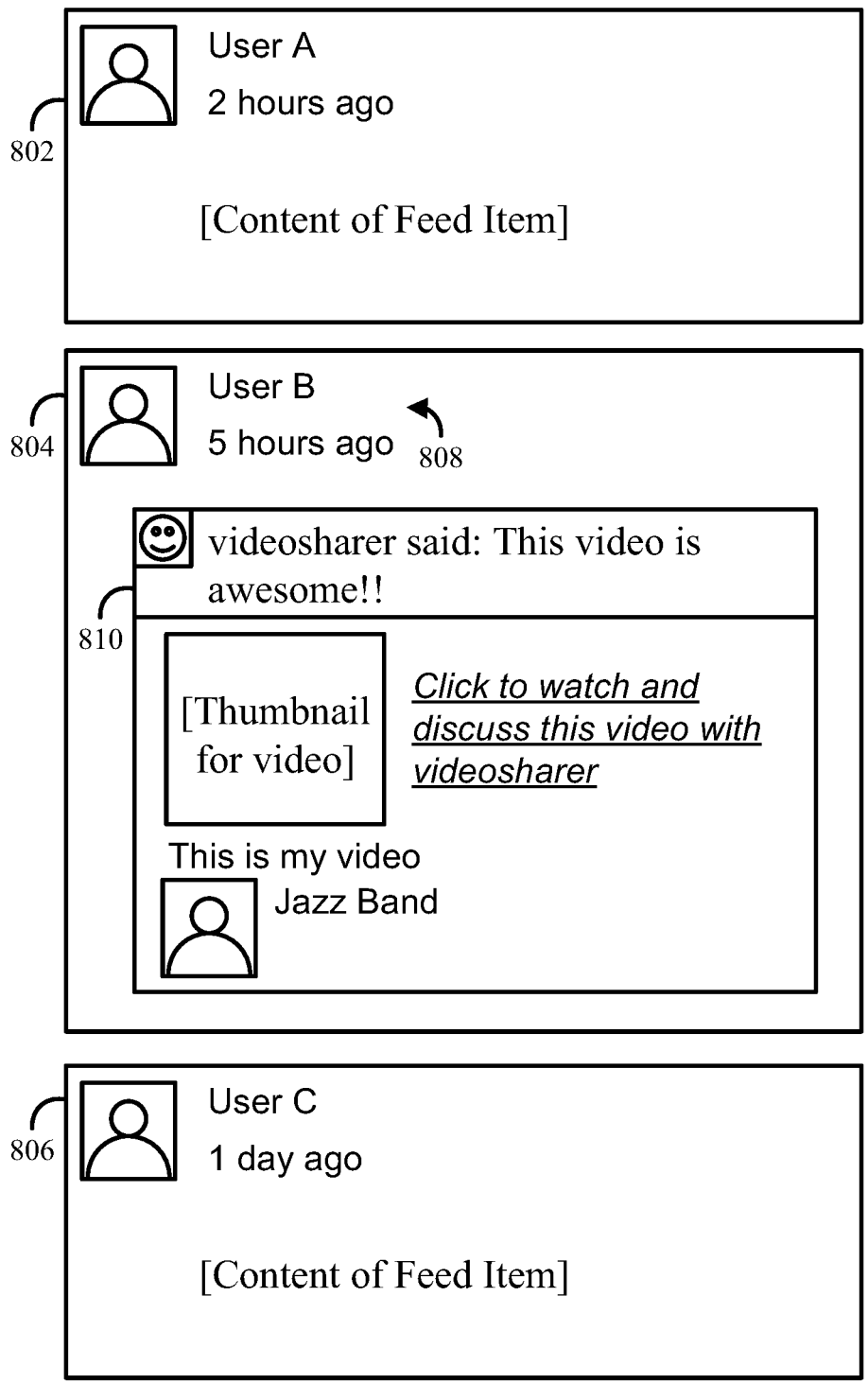
FIG. 8 shows an example of a user interface of a media platform in which a link to a social messenger conversation related to one or more media content items is presented in accordance with some embodiments of the disclosed subject matter.

FIG. 8 shows an example 800 of a user interface of a media platform in which a link to a social messenger conversation related to one or more media content items is presented in accordance with some embodiments of the disclosed subject matter. As shown in FIG. 8, user interface 800 can include feed items 802-806, which can be any suitable feed items from social connections on the social media platform of a user that is logged in to the social media platform. In some embodiments, feed item 804 can be a feed item from a user with a username 808 of "User B" on the social media platform. As shown in FIG. 8, feed item 804 includes formatted hyperlink 810 that is linked to a social messenger conversation related to a video content item shared by a user and/or user account (e.g., with username "video sharer") of a social media platform through which the shared media content is accessible. In the example shown in FIG. 8, "User B" and "videosharer" may be user accounts on different services that are associated with the same user or entity.

In some embodiments, the link can be presented as a text hyperlink without formatting. For example, in addition to or in lieu of formatted hyperlink 810 being presented, the address from which the content can be requested can be presented as a URL or other suitable address. Additionally or alternatively, in some embodiments, in lieu of a hyperlink, a non-selectable URL can be presented.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for providing a media consumption history annotated with social context are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting media consumption information, the method comprising:
    receiving, from a user device that is associated with a consuming user, a request to view one or more video items;
    determining that the request is associated with the consuming user having a user account;
    determining, from a media consumption database storing information corresponding with the user account that was associated with the request to view the one or more video items, social context information that comprises (i) information indicating video items shared with the consuming user by one or more sharing users and (ii) information indicating video items watched by the consuming user with one or more other users, wherein the information indicating video items watched by the consuming user with the one or more other users is determined based on randomized alphanumeric information encoded in an address used by the one or more other users that separately identifies the one or more users; and
    causing, via a user interface that includes media content items for presentation, a plurality of video elements that each represent one of a plurality of video items to be presented, wherein the plurality of video items includes a video item that is represented by a video element and wherein the video element is presented along with (i) a first indication that the video item was shared with the consuming user by the one or more sharing users based on the social context information and (ii) a second indication that the video item was previously watched by the consuming user with at least one other user based on the social context information.

2. The method of claim 1, wherein the address is a first address, the method further comprising receiving, from the one or more sharing users, a request to share the video item, wherein a second address is associated with the video item that includes a plurality of characters associated with the one or more sharing users.

3. The method of claim 2, further comprising:
    receiving, from the user device that is associated with the consuming user, a request to play the video item;
    determining, based on the plurality of characters included in the second address, that the request to play the video item is associated with the request, from the one or more sharing users, to share the video item; and
    in response to receiving the request to play the video item, storing information related to the request to play the video item and the social context information, wherein the social context information comprises information indicating that the request to play the video item is associated with the one or more sharing users.

4. The method of claim 1, wherein the media consumption database further stores information indicating that the video item was shared in the context of a social messenger conversation.

5. The method of claim 4, wherein the address further indicates the one or more other users were included in the social messenger conversation.

6. The method of claim 4, wherein the information indicating that the video item was shared in the context of the social messenger conversation comprises a URL associated with a location in the social messenger conversation where the video item was shared.

7. A system for presenting media consumption information, the system comprising:
    a hardware processor that is programmed to:
    receive, from a user device that is associated with a consuming user, a request to view one or more video items;
    determine that the request is associated with the consuming user having a user account;
    determining, from a query to a media consumption database storing information corresponding with the user account that was associated with the request to view the one or more video items, social context information that comprises (i) information indicating video items shared with the consuming user by one or more sharing users and (ii) information indicating video items watched by the consuming user with one or more other users, wherein the information indicating video items watched by the consuming user with the one or more other users is determined based on randomized alphanumeric information encoded in an address used by the one or more other users that separately identifies the one or more users; and cause, via a user interface that includes media content items for presentation, a plurality of video elements that each represent one of a plurality of video items to be presented, wherein the plurality of video items includes a video item that is represented by a video element and wherein the video element is presented along with (i) a first indication that the video item was shared with the consuming user by the one or more sharing users based on the social context information and (ii) a second indication that the video item was previously watched by the consuming user with at least one other user based on the social context information.

8. The system of claim 7, wherein the address is a first address and the hardware processor is further programmed to receive, from the one or more sharing users, a request to share the video item, wherein a second address is associated with the video item that includes a plurality of characters associated with the one or more sharing users.

9. The system of claim 8, wherein the hardware processor is further programmed to:
receive, from the user device that is associated with the consuming user, a request to play the video item;
determine, based on the plurality of characters included in the second address, that the request to play the video item is associated with the request, from the one or more sharing users, to share the video item; and
in response to receiving the request to play the video item, store information related to the request to play the video item and the social context information, wherein the social context information comprises information indicating that the request to play the video item is associated with the one or more sharing users.

10. The system of claim 7, wherein the media consumption database further stores information indicating that the video item was shared in the context of a social messenger conversation.

11. The system of claim 10, wherein the address further indicates the one or more other users were included in the social messenger conversation.

12. The system of claim 10, wherein the information indicating that the video item was shared in the context of the social messenger conversation comprises a URL associated with a location in the social messenger conversation where the video item was shared.

13. A non-transitory computer-readable medium containing computer executable instructions that, when executed by a processor, cause the processor to perform a method for presenting media consumption information, the method comprising:
receiving, from a user device that is associated with a consuming user, a request to view one or more video items;
determining that the request is associated the consuming user having a user account;
determining, from a media consumption database storing information corresponding with the user account that was associated with the request to view the one or more video items, social context information that comprises (i) information indicating video items shared with the consuming user by one or more sharing users and (ii) information indicating video items watched by the consuming user with one or more other users, wherein the information indicating video items watched by the consuming user with the one or more other users is determined based on randomized alphanumeric information encoded in an address used by the one or more other users that separately identifies the one or more users; and causing, via a user interface that includes media content items for presentation, a plurality of video elements that each represent one of a plurality of video items to be presented, wherein the plurality of video items includes a video item that is represented by a video element and wherein the video element is presented along with (i) a first indication that the video item was shared with the consuming user by the one or more sharing users based on the social context information and (ii) a second indication that the video item was previously watched by the consuming user with at least one other user based on the social context information.

14. The non-transitory computer-readable medium of claim 13, wherein the address is a first address and the method further comprises receiving, from the one or more sharing users, a request to share the video item, wherein a second address is associated with the video item that includes a plurality of characters associated with the one or more sharing users.

15. The non-transitory computer-readable medium of claim 14, wherein the method further comprises:
receiving, from the user device that is associated with the consuming user, a request to play the video item;
determining, based on the plurality of characters included in the second address, that the request to play the video item is associated with the request, from the one or more sharing users, to share the video item; and
in response to receiving the request to play the video item, storing information related to the request to play the video item and the social context information, wherein the social context information comprises information indicating that the request to play the video item is associated with the one or more sharing users.

16. The non-transitory computer-readable medium of claim 13, wherein the media consumption database further stores information indicating that the video item was shared in the context of a social messenger conversation.

17. The non-transitory computer-readable medium of claim 16, wherein the address further indicates the one or more other users were included in the social messenger conversation.

18. The non-transitory computer-readable medium of claim 16, wherein the information indicating that the video item was shared in the context of the social messenger conversation comprises a URL associated with a location in the social messenger conversation where the video item was shared.

* * * * *